April 13, 1943. F. BRUNKE 2,316,553
CONTACT PLATE FOR DRY PLATE ELEMENTS
Filed Nov. 13, 1939
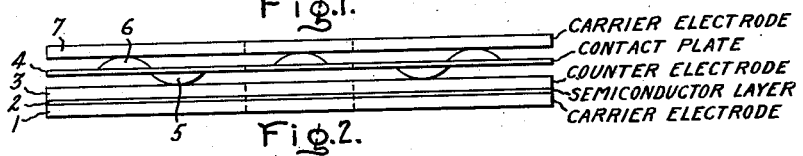
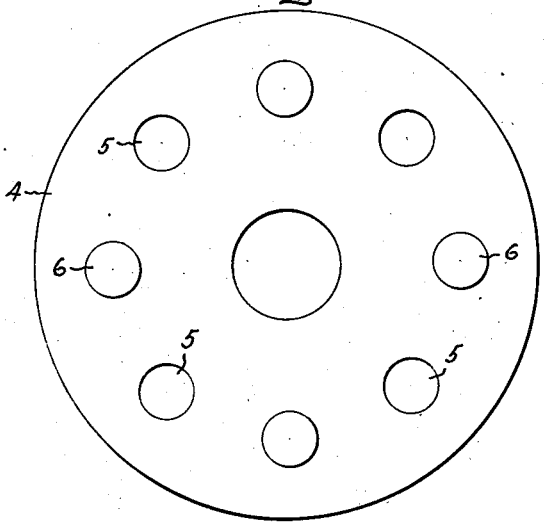
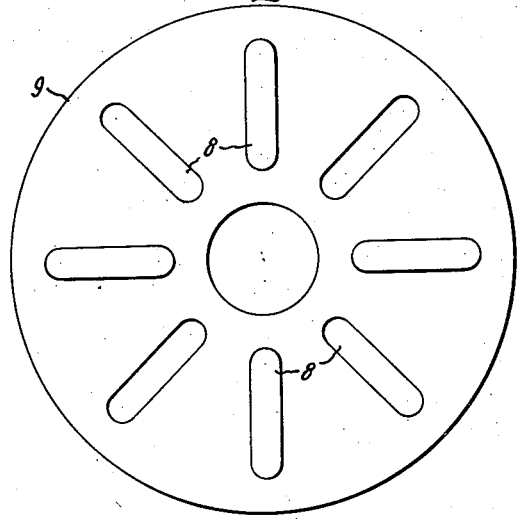
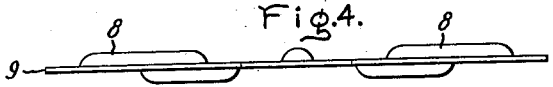
Inventor:
Fritz Brunke,
by Harry E. Dunham
His Attorney.

Patented Apr. 13, 1943

2,316,553

UNITED STATES PATENT OFFICE 2,316,553

CONTACT PLATE FOR DRY PLATE ELEMENTS

Fritz Brunke, Berlin-Reinickendorf, Germany, assignor to General Electric Company, a corporation of New York Application November 13, 1939, Serial No. 304,258
In Germany November 24, 1938

4 Claims. (Cl. 175—366)

My invention relates to dry plate elements such as dry plate rectifier cells or the like, particularly to connection means for such cells, and its object is to provide an improved connection means for the electrodes of dry plate cells or elements whereby more reliable contact between the electrodes and the connection means and more efficient cooling of the elements are obtained.

In dry plate rectifier elements or the like comprising a carrier electrode, a semi-conductor layer in contact with and supported by the carrier electrode, and an electrically conducting layer in contact with the semi-conductor layer and functioning as a counter-electrode, the conducting of current from the counterelectrode is usually accomplished by means of a metal plate which is held under pressure against the counterelectrode of the dry plate cells or elements forming the extremity of a group of such elements. To provide a reliable and permanent contact between the metal plate and the counterelectrode a relatively high pressure has been required heretofore the slightest alteration of which entails an undesirable change of the electrical constants of the rectifier or like device. Only by employing great pressure has it been possible to maintain a close contact, even in case of slight vibration of the cell or element. It is a further disadvantage of such contact plates employed heretofore that, by reason of the large contact plate surface in close engagement with the counterelectrode, upon placing the rectifier or like unit in service the heat generated internally under load tends to be retained, thereby reducing the load capacity of the unit.

The above disadvantages are overcome in accordance with the present invention by so constructing the contact or pressure plate that it is not applied over its entire surface to the counterelectrode of the adjoining element. On the contrary, the contact plate is provided with portions which are elevated above the normal surface and which are produced preferably by a pressing or stamping operation on the plate. When the device is assembled these elevations alone are pressed against the counterelectrode. By reason of the gaps which exist between the elevations, an efficient cooling of the unit is possible. Since the points or lines of contact constituted by the elevations have small superficies, therefore for the producing of a reliable contact between the plate and the counterelectrode a much lower overall pressure in the unit is required than is required in the case of the usual contact plates which are applied over their entire surface to the electrode.

The contact plates in accordance with the present invention thus insure, by reason of the substantially unchangeable contact surface provided, a more reliable and permanent engagement than obtained by contact plates heretofore employed. Since, moreover, the contact plate in accordance with the present invention is applied at only a few points of the counterelectrode, a certain amount of spring action is inherent in the plate which aids in insuring good contact when the unit is subjected to vibration.

My invention will be better understood from the following description when considered in connection with the accompanying drawing and its scope will be pointed out in the appended claims.

Referring to the drawing, Figs. 1 and 2 are respectively side elevational and plan views of a dry plate cell or element including a pressure or contact plate in accordance with the invention, and Figs. 3 and 4 are respectively plan and side elevational views of a modification of the contact plate shown in the embodiment of Figs. 1 and 2.

In Fig. 1 a rectifier cell or element or the like is shown comprising the usual carrier electrode 1, semi-conductor layer 2, and counterelectrode 3. The contact plate 4, of sheet metal, is pressed by means not shown which usually include a central mounting bolt, into engagement with the counterelectrode 3 at the tops of elevations 5 preferably pressed or stamped from the body of the sheet 4. These elevations 5, as shown, may take the form of spherical "calottes" or dome-shaped elements, and preferably are pressed into the plate in a symmetrical arrangement.

It is preferable to provide elevations pressed into the plate 4 from both sides. For example, elevations 6 are preferably provided, pressed from the lower side of plate 4 and corresponding to the elevations 5 pressed from the upper side of the plate. In this manner the desirable properties of the contact plate elevations are still more effective when, as illustrated in Fig. 1, such a contact plate as 4 is arranged in the interior of a group of cells or elements. In this figure the plate 4 is shown as being in contact through the lower elevations 5 with the counterelectrode 3 of one cell, and through the upper elevations 6 with the carrier electrode 7 of a succeeding cell the other plates or layers of which are not shown.

As shown in Figs. 3 and 4, the elevations 8 pressed or otherwise formed in or on the contact plate 9 may be of oblong shape, and for example as further shown particularly in Fig. 3 may be arranged in a radial pattern in the contact plate, such plates being in practice usually of circular shape.

It will be seen that the dome-shaped elevations 5 of Figs. 1 and 2 and the elongated elevations 8 of dome-shaped cross section of Figs. 3 and 4 are not cut from the contact plates but are continuous with the surface thereof and that they are of small height relative to their width. Further, it will be seen that these thin, low, rounded elevations provide at their summits a plurality of small resilient areas of engagement between the contact plates and the adjoining electrode or electrodes. Thus by the indenting of the contact plate to form the elevations in the manner shown, the plate is not cut or weakened, and, at the same time, by reason of the added resiliency provided by these summit areas, reliable electrical engagement between the electrodes and the contact plates is more easily maintained at the desired low pressures, even under excessive vibration.

It will be understood that the elevations formed in or on contact plates, of circular or other form, may be of still other shapes and arrangements than shown.

My invention has been described herein in particular embodiments for purposes of illustration. It will be understood, however, that the invention is susceptible of various changes and modifications and that by the appended claims I intend to cover any such modifications as fall within the true spirit and scope of my invention.

What I claim as new and desire to secure by Letters Patent of the United States is:

1. In a dry plate rectifier and the like comprising a carrier electrode, a semi-conductor layer thereon, a counterelectrode in contact with said layer, and a second carrier electrode, a contact plate interposed between said second carrier electrode and said counterelectrode having dome shaped elevations continuous with said plate and of small height relative to the diameter thereof, said elevations providing the only portions of said contact plate engaging the surface of said electrodes, said elevations being adapted to make permanent electrical contact with said counterelectrode and said second carrier electrode when only a relatively low operating pressure is applied to said rectifier, said elevations being directed alternately toward said counterelectrode and said second carrier electrode.

2. In a group of dry plates rectifier cells and the like comprising the counterelectrode of one cell of said group and the carrier electrode of the succeeding cell of said group, a contact plate mounted between said electrodes and having elevations of dome-shaped cross section directed alternately toward said counterelectrode and said carrier electrode and being adapted to make permanent electrical contact with said electrodes under relatively low operating pressure applied to said group, said elevations being of small height relative to the width thereof and continuous with said plate, said elevations providing the only portions of said contact plate in engagement with said electrodes.

3. In a dry plate rectifier and the like comprising a carrier electrode, a semi-conductor layer thereon, a counterelectrode in contact with said layer, and a second carrier electrode, a contact plate interposed between said second carrier electrode and said counterelectrode having dome-shaped elevations continuous with said plate and raised from the surface thereof a short distance relative to the diameter of said elevations to reduce to a relatively low value the operating pressure required to be applied to said rectifier to maintain permanent electrical contact between said plate and said second carrier electrode and said counterelectrode, said elevations being directed alternately toward said counterelectrode and said second carrier electrode, said elevations at their summits providing a plurality of small resilient areas of engagement between said plate and said electrodes.

4. In a group of dry plate rectifier cells and the like comprising the counterelectrode of one cell of said group and the carrier electrode of the succeeding cell of said group, a contact plate mounted between said electrodes and having elevations of dome-shaped cross section directed alternately toward said counterelectrode and said carrier electrode to reduce substantially the operating pressure required to be applied to said group to maintain permanent electrical contact between said plate and said electrodes, said elevations being continuous with said plate, the height of said elevations being small relative to the width thereof and said elevations providing at their summits a plurality of resilient areas of engagement between said plate and said electrodes, said areas providing the only portions of said contact plate in engagement with said electrodes.

FRITZ BRUNKE.